Oct. 15, 1968 LE ROY C. TILLOTSON 3,406,401

COMMUNICATION SATELLITE SYSTEM

Filed Aug. 25, 1966 2 Sheets-Sheet 1

INVENTOR
L. C. TILLOTSON
BY Roy M. Porter Jr.
ATTORNEY

United States Patent Office 3,406,401

Patented Oct. 15, 1968

3,406,401

COMMUNICATION SATELLITE SYSTEM

Le Roy C. Tillotson, Holmdel, N.J., assignor to Bell Telephone Laboratories, Incorporated, Murray Hill, N.J., a corporation of New York Filed Aug. 25, 1966, Ser. No. 575,006
8 Claims. (Cl. 343—100)

ABSTRACT OF THE DISCLOSURE

A synchronous satellite communication system for communicating simultaneously with a number of ground stations at points on the earth in which the satellite antenna comprises a concave spherical reflector with a plurality of feeds distributed at points on a focal surface beneath said reflector that correspond respectively to the image locations on this surface of each of said earth points. Each feed therefore communicates with one of the ground stations and is associated with one of a plurality of repeaters in the satellite.

This invention relates to long distance radio communication systems and more particularly to an artificial earth satellite system which communicates simultaneously with a plurality of spaced ground stations.

A number of systems have been proposed for long distance communication using one or more artificial satellites placed in orbit around the earth and in the past several years highly publicized experiments have dramatically demonstrated the practicality and importance of these systems.

In general, the systems proposed have either transmitted the same intelligence bearing signal to or from all of a plurality of ground stations at the same frequency or else have communicated separately with different ground stations at different frequencies. The desirability of communicating at a given frequency with a plurality of stations has been recognized. Heretofore, however, multiple antennas having sufficient directional discrimination for this purpose have rendered the satellite too complicated to be of practical value.

It is therefore an object of the present invention to improve satellite communication systems.

It is a further object to provide simultaneous communication with a plurality of ground stations from a single satellite at the same frequency.

It is a more specific object to improve satellite antenna design.

The present invention contemplates the use of a synchronous satellite placed in a circular, equatorial, 24-hour orbit such that the satellite remains steady over one limited portion of the earth.

In accordance with the present invention an antenna design is provided which when used in combination with a synchronous satellite will allow simultaneous communication at the same frequency with a plurality of ground stations located at spaced points on the earth within radio visibility of the satellite. This antenna comprises a first concave reflecting surface, such as a segment of the inside of a conductive sphere, which is fed from a plurality of points defining a second curved surface which passes through the focus of the first. The reflecting surface is directed to radiate and collect electromagnetic radiation traveling between the satellite and the earth, and each of the feed points corresponds respectively to the image location on this second surface of each of the earth points. Each feed, therefore, communicates with one of the ground stations and is associated with one of a plurality of repeaters in the satellite.

These and other objects and features, the nature of the present invention and its various advantages, will appear more fully upon consideration of the specific illustrative embodiment shown in the accompanying drawings and described in detail in the following explanation of these drawings.

Figure 1:
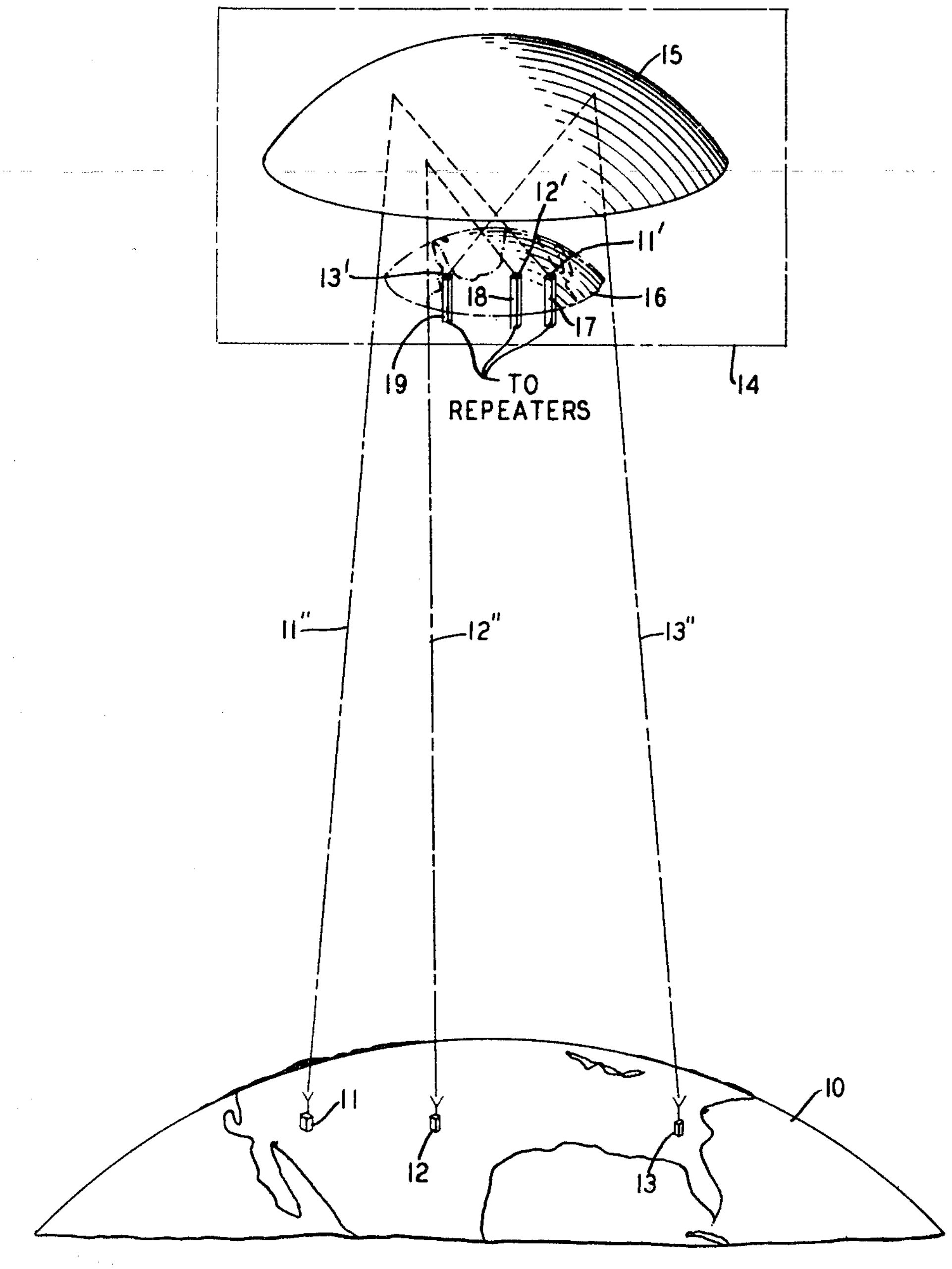
FIG. 1 is a stylized, pictorial representation of a part of a satellite in accordance with the invention in orbit above the earth.

Referring more particularly to FIG. 1, a communication system of the type contemplated by the invention is shown on a grossly out of scale and highly stylized drawing which, however, best serves to illustrate the principles of the invention. Illustrated on the earth's surface 10 are a plurality of ground stations 11, 12 and 13 spaced in different sections of continental North America. Each station may include either a transmitter or a receiver and preferably each includes both a transmitter and a receiver for two way communication. Narrow beam, directive antennas are included at each station which may, for example, be of the horn-reflector type now in use with satellite communications as described, for example, in connection with the Telstar System in vol. XLII of the BSTJ July 1963 or of the directional array type described in C. C. Cutler et al., Patent 3,273,151 granted Sept. 13, 1966. In the first system the antenna is steered by mechanical means and tracks the satellite by radar-like techniques while the latter steers on the basis of a multi-element phased array antenna and tracks by means of a signal or pilot received from the satellite.

The spacecraft itself is schematically represented by boundary 14. It is assumed to be in the synchronous orbit defined and includes, in addition to other equipment to be described hereinafter, a concave conductive reflector 15 which in a preferred embodiment comprises a segment of a sphere. While out of scale on the drawing, such a reflector would in a practical application have a diameter in the order of 10 feet, being formed as a segment of the sphere having a diameter in the order of 26 feet.

The invention makes use of certain properties of a spherical reflector. Recall that the focus of such a reflector is conventionally defined as lying on its "spherical axis" half way between the surface and its center of curvature. Rays arriving parallel to this axis are brought together at this focal point. The present invention recognizes, however, that there are an infinite number of "spherical axes," each having a focal point which lies on a spherical surface having the same center of curvature as the reflecting surface and one-half of its radius. Such a "focal surface" is illustrated in FIG. 1 by the surface 16.

Since surface 16 contains one unique focal point for rays arriving at reflector 15 from a given direction and other unique focal points for rays arriving from other directions (within the limits of diffraction and tolerable spherical aberration), an inverted, reversed, focused image is reproduced on surface 16 of all that lies within the "visibility" of reflector 15 on the earth. This is represented on FIG. 1 by the points 11′, 12′ and 13′ on surface 16, representing the images of ground stations 11, 12 and 13, respectively. Single rays 11″, 12″ and 13″, connecting each of the points are symbolic of the infinite number of rays which are actually brought to focus on each point.

In accordance with the invention an independent feed is located at each of image points 11′, 12′ and 13′ as schematically represented by waveguides 17, 18 and 19, respectively, terminating substantially in the plane of surface 16. Each feed in turn is connected to suitable microwave repeater equipment carried on board the satellite.

Further consideration will be given to this equipment hereinafter. Thus an intelligence bearing microwave signal transmitted, for example, from ground station 11 will be received at point 11' by feed 17. If this signal is amplified, otherwise processed and retransmitted through feed 19, it will be received at ground station 13. Alternatively, the signal received from station 11 could be retransmitted through feed 18 and received by ground station 12, or the intelligence signal divided and part of it retransmitted on each of feeds 18 and 19. The respective parts are thus received at each ground station 12 and 13.

In accordance with a feature of the invention, adjacent ground stations are located outside of the area illuminated by the transmitted beam from an adjacent feed. Thus the signal retransmitted through feed 19 is not received at either ground station 11 or ground station 12. Conversely the signal transmitted from any one ground station is not received at a feed corresponding to another ground station.

Restrictions necessary to meet this requirement are not severe. For example, the present invention contemplates operation in the 10 to 30 gigahertz band, a band which has not heretofore proved entirely satisfactory for common carrier microwave communication between two ground points because of excessive outage due to rain attenuation. In the lower end of such a band the radiation lobe produced by a 10 foot spherical antenna fed by a feed aperture 1.75 inches square and located in an equatorial orbit about 22,300 miles from the earth would have a beam width that illuminates an elliptical area on the ground in the United States having an east-west extending minor axis of approximately 260 miles. This axis length decreases as frequency increases until it is approximately one-half this distance at the upper end of the band. Allowing for ample discrimination between areas, ground stations in the order of six or seven can be located in the United States and at least one other in Canada, Mexico, or both. The resulting spacing requires that the satellite be maintained within 100 miles of its assigned station in orbit and that it be stabilized such that the pointing of the antenna beam is maintained within $\pm\frac{1}{10}$ degree in order that each station continue to be in communication only with that feed located at the image point on surface 16 that corresponds to the ground location of the station. This station keeping and stabilization requirement is easily met by present techniques to be defined hereinafter. Since the United States and Canada are already divided into regions as part of the Distance Dialing Network of the American Telephone and Telegraph Company, the eight regional switching centers, located in Seattle, Wash.; San Bernardino, Calif.; Denver, Colo.; Dallas, Tex.; Norway, Ill.; Rockdale, Ga.; Wayne, Penn., and Regina Saskatchewan, constitute properly spaced and otherwise ideal locations for the ground stations.

Figure 2:
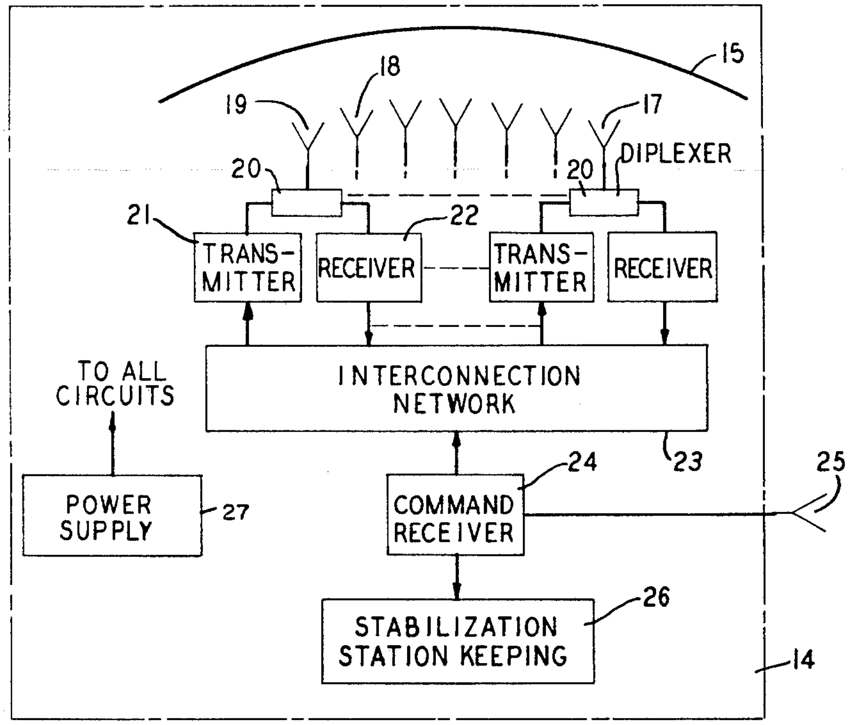
FIG. 2 is a block diagram schematic of components within the satellite.

FIG. 2 shows schematically other components which are included within satellite 14. Since these components are all based upon known designs, they are represented by block diagrams only. Thus, in addition to reflector 15 and the associated feeds 17 through 19, the satellite includes suitable microwave repeater equipment for receiving signals transmitted from the ground and for amplifying and retransmitting them. For greatest flexibility of the invention, each feed 17 through 19 is associated with a separate radio transmitter such as 21 and a radio receiver such as 22 combined by way of a known diplexer 20, such as for example, a circulator which connects each feed 17 through 19 with its associated receiver and transmitter while keeping the receiver and transmitter isolated. The outputs of the receivers and the inputs to the transmitters may comprise the baseband or intelligence signals themselves or they may be signals at a suitable intermediate frequency. In either event they are applied to and received from an interconnection network 23 comprising suitable filters and switches under control of signals received from the ground by command receiver 24 over auxiliary antenna 25. The function of network 23 is to connect any one or more of the receivers 22 with any one or more of the transmitters 21 as may be directed from the ground. The switching devices may be mechanical, electronic or they may comprise matrices of diodes according to known designs. By including filters of the channel dropping type in network 23, the output from any given receiver may be separated into a plurality of subbands which in turn can be connected singly or in groups to the transmitters. It should be understood, of course, that for a given application, the connections between respective transmitters and receivers may be "solid wired," in which case network 23 can be eliminated.

Satellite 14 additionally includes a stabilization-station keeping system 26 capable of stabilizing the satellite as specified hereinbefore in three dimensions with reflector 15 directed toward one portion of the earth. Requirements in all respects suitable for the present invention have been recently demonstrated by the Syncom experiments. While an extensive discussion of stabilization and antenna pointing (direction) techniques is beyond the scope of the present disclosure, the function can be accomplished alternatively by use of a spin stabilized satellite with a de-spun antenna-electronics package, as is well known to the art, or by use of a 3-axis stabilization subsystem using hot or cold gas or other jets or by spinning wheels or a combination of the two. Studies have shown that the amount of fuel required to stabilize a 2000 pound satellite in synchronous equatorial orbit for 10 years to $\pm\frac{1}{10}$ degree is only a few tens of pounds. The Nimbus weather satellites are an example of vehicles stabilized by small cold gas jets. A good general discussion of such devices is given by Michel E. Maes and George S. Sutherland in "International Science and Technology" for August 1966, No. 56, p. 38. A very complete description of a much more complicated 3-axis stabilization system used on a Mars probe is given in NASA Technical Report No. 32–740, "Mariner Mars 1964 Project Report: Mission and Spacecraft Development, vol. 1, From Project Inception Through Midcourse Maneuver," Mar. 1, 1965, pp. 214–290, Jet Propulsion Laboratory. The present problem is simpler in that vehicle orientation can be precisely determined on earth, for example, as taught in C. C. Cutler Patent 3,137,853, granted June 16, 1964, and commands sent to the spacecraft to correct errors. For this purpose stabilization system 26 may be under ground control by way of command receiver 24 as shown on FIG. 2.

Finally, satellite 14 includes a power supply 27 which may comprise solar cells, long-life storage batteries or both. Power is fed from the power supply to each of the other components by connections not indicated. Details of several alternative designs for any of these components may be found in the art and circuits suitable for each have been employed in recently conducted satellite experiments. See, for example, the several publications set forth hereinbefore.

Figure 3:
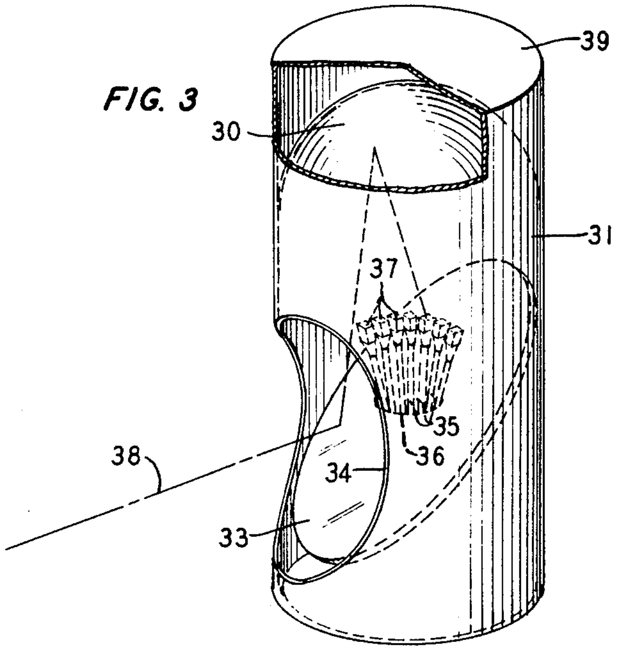
FIG. 3 is a perspective view of the satellite in accordance with the invention showing an illustrative construction thereof.

The illustrative embodiment of the invention shown in FIG. 3 facilitates mounting the multiple feeds with respect to the spherical reflector. Thus reflector 30 comprises a spherical end section of a cylindrical satellite body 31. Since it is the inside, concave surface of reflector 30 which is of interest, the outer contour thereof is immaterial as shown by cylindrical cover 39. Body 31 is divided by a plane, conductive reflector 33 extending at an angle, preferably one of 45 degrees, to the cylindrical axis of body 31. An aperture 34 on the circumference of body 31 is positioned so that electromagnetic waves received through aperture 34 as represented by rays 38 are reflected by plane surface 33 toward spherical surface 30. Obviously, aperture 34 may be provided with a cover, not shown, of material transparent to electromagnetic waves. Multiple feeds 35 project through an aperture 36 in reflector 33 and terminate in horns 37 distributed substantially on the focal surface of reflector 30 as described hereinbefore. It is preferred that each of horns 37 be of the pyramidal horn type having a square cross section excited by an electric field along a diagonal thereof. This excitation of a spherical reflector has been shown to produce a minimum of side lobes. See, for example, the publication of T. Li, "Study of Spherical Reflectors as Wide-Angle Scanning Antennas," IRE Transactions on Antennas and Propagation, vol. AP–7, pages 223–226, July 1959. As pointed out by Li, a square feed so used (since it is not a true point source) requires minor empirical adjustment away from the optical focal point of the sphere at a given frequency. Thus feeds 35 may terminate at points removed by minor percentages above or below the optical focal surface of reflector 30 as required. The other components of the satellite repeater are located within body 31 on the opposite side of plane reflector 33 from spherical reflector 30. Body 31 is then launched and stabilized with aperture 34 directed toward the portion of the earth's surface containing the ground stations of interest.

While the principles of the invention have been described in terms of a spherical reflector, it should be understood that a segment of a circular cylinder would be useful in certain applications. Since a circular cylinder would produce a beam focused only in one dimension, a strip of radiation would be produced on the earth's surface corresponding to each feed.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A communication satellite including an antenna having a concave spherical reflecting surface, means for feeding said reflecting surface at a plurality of points at least one of which is displaced from a straight line connecting two other of said points, said points defining a second surface having the same center of curvature as said first surface and substantially half its radius, and repeater means within said satellite for receiving intelligence bearing electromagnetic wave energy from a feed at one of said points and for retransmitting the intelligence thereof through a feed at another of said points.

2. A communication system comprising a satellite, a plurality of ground stations located at spaced points on the earth within radio visibility of said satellite, said points including at least one which is displaced from a straight line connecting two other of said points, said satellite including an antenna having a concave reflecting surface directed to radiate and collect electromagnetic wave energy traveling between said satellite and said ground stations, and means for feeding said reflecting surface at a plurality of points at least one of which is displaced from a straight line connecting two other of said feed points and which correspond respectively to the image locations of each of said ground station earth points on a second surface defined by said plurality of points.

3. The system of claim 2 wherein said reflecting surface has a given radius of curvature and wherein said second surface has the same center of curvature as said first surface and substantially half of said radius.

4. The system of claim 2 including repeater means within said satellite for receiving intelligence bearing signals from one of said ground stations by way of one of said feeding means and for retransmitting the intelligence thereof to another of said ground stations by way of another of said feeding means.

5. The system of claim 2 including a plurality of repeater means within said satellite for simultaneously receiving intelligence bearing signals from a plurality of said ground stations by way of a plurality of said feeding means and for retransmitting the intelligence of each of said received signals over a feed different from the one on which it was received.

6. The system of claim 2 wherein said satellite is in a synchronous, 24-hour equatorial orbit.

7. The system of claim 2 including a plane reflecting surface angled to direct radiation received from the earth upon said concave reflecting surface.

8. A communication system comprising a satellite synchronized above the earth, at least three ground stations located at spaced points on the earth within the radio visibility of said satellite, said points being broadly distributed over the surface of the earth to include at least one point which is defined by a latitude and longitude different from both the latitude and longitude defining another of said points, said satellite including an antenna having a concave spherical reflecting surface of given radius directed to radiate and collect electromagnetic wave energy traveling between said satellite and said ground stations on the earth, a plurality of feeds directed toward said reflecting surface at a plurality of points defining a second surface having the same center of curvature as said first surface and substantially half said radius, said points corresponding respectively to the image locations on said second surface of each of said ground station earth points, and a plurality of repeater means within said satellite for simultaneously receiving intelligence bearing electromagnetic wave signals from respective ones of said feeds and for retransmitting the intelligence thereof through others of said feeds.

References Cited

UNITED STATES PATENTS 3,095,538 6/1963 Silberstein.
3,317,912 5/1967 Kelleher ------------ 343—836

FOREIGN PATENTS 335,425 2/1959 Switzerland.

RICHARD A. FARLEY, *Primary Examiner.*

T. H. TUBBESING, *Assistant Examiner.*